Charles S. Stone
INVENTOR.

BY
Arnold and Roylance
ATTORNEYS

Sept. 2, 1969   C. S. STONE   3,465,264
PHASE INDICATOR
Filed Dec. 14, 1964   4 Sheets-Sheet 2
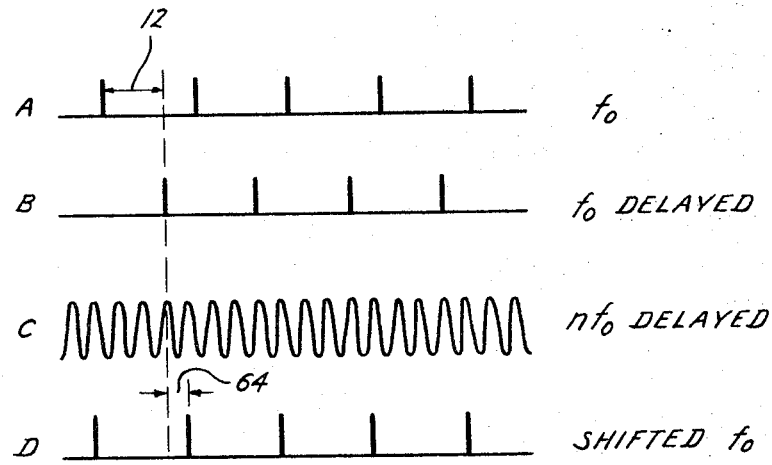
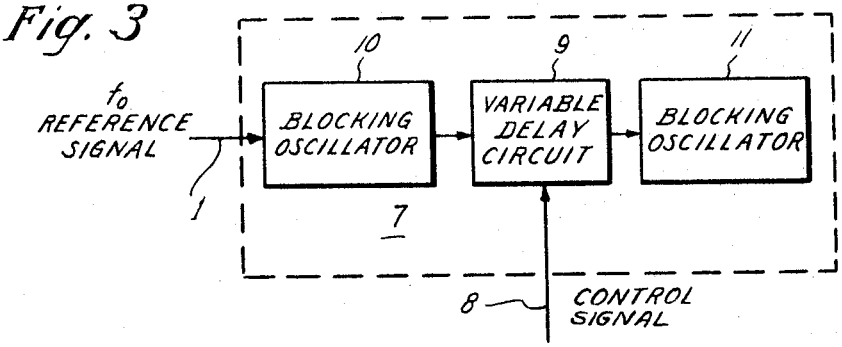
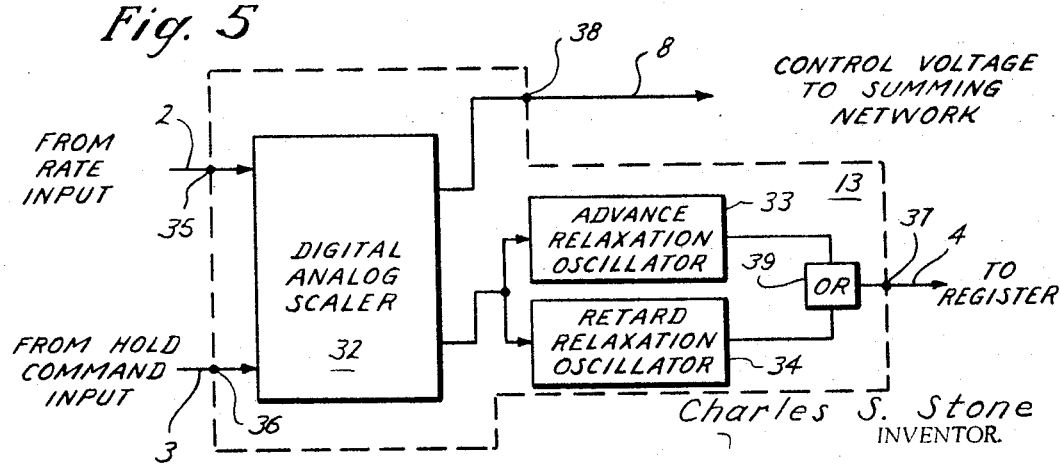
Charles S. Stone
INVENTOR.
BY
Arnold and Roylance
ATTORNEYS

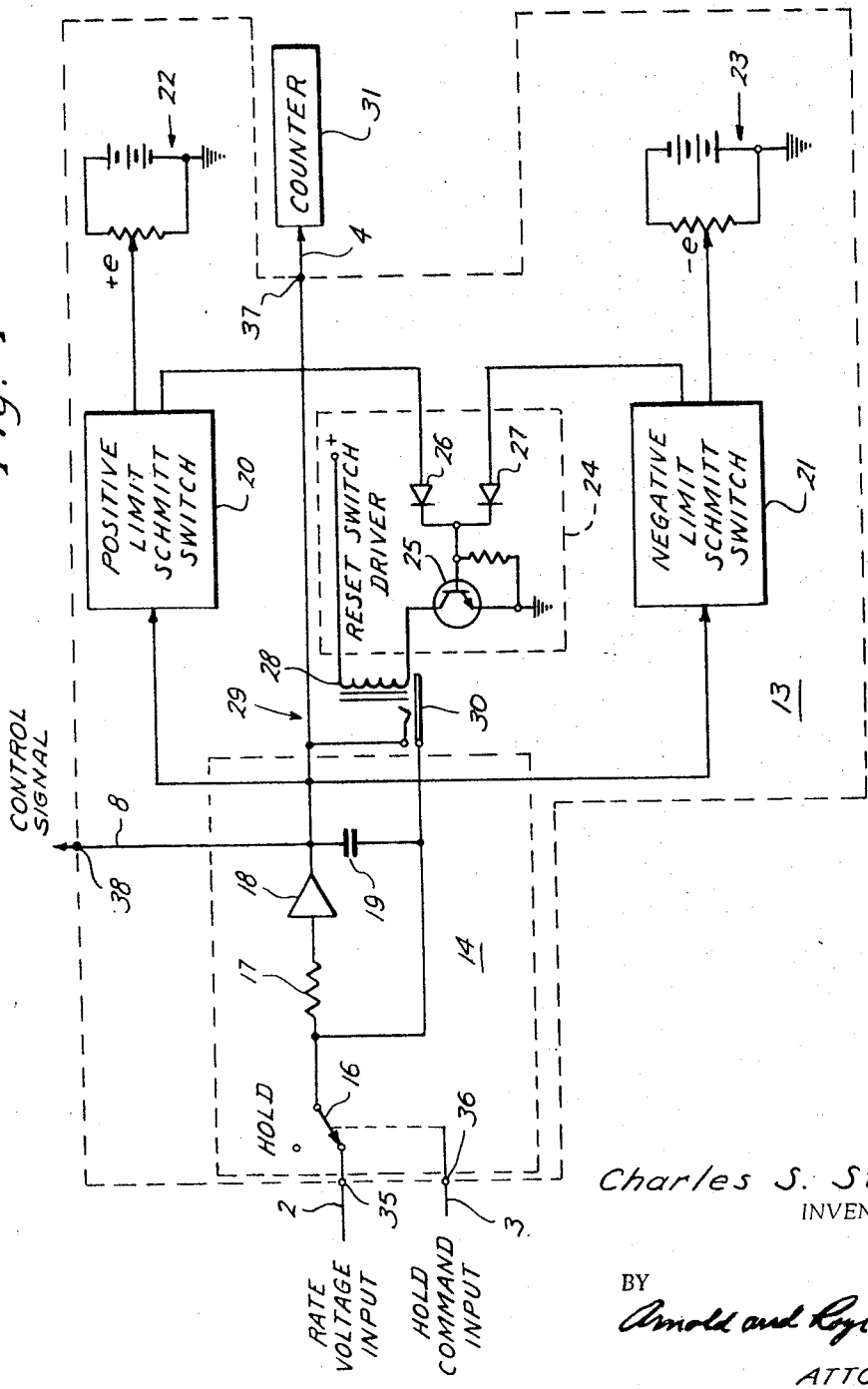

Sept. 2, 1969      C. S. STONE      3,465,264

PHASE INDICATOR

Filed Dec. 14, 1964      4 Sheets-Sheet 4

Charles S. Stone
INVENTOR.

BY
Arnold and Roylance
ATTORNEYS

United States Patent Office 3,465,264
Patented Sept. 2, 1969

3,465,264
PHASE INDICATOR
Charles S. Stone, Austin, Tex., assignor to Tracor, Inc., Travis, Tex., a corporation of Texas
Filed Dec. 14, 1964, Ser. No. 418,013
Int. Cl. H03b 11/08, 11/10; G01r 25/00
U.S. Cl. 331—166                 1 Claim This invention relates to phase indicating circuits and more specifically to circuits capable of receiving an error voltage and indicating the phase shift from a reference signal represented by such a voltage.

In many applications, typical of which are navigational, radar range tracking, and VLF phase tracking receivers operating under conditions in which the phase relationship of one signal is compared with that of another, electromechanical servoresolvers have been employed for deriving phase information. In such an application, the rate voltage, sometimes referred to as error voltage, applied is representative of a specific phase shift from a reference signal in electrical degrees. Often this phase shift may be equal to many cycles of phase shift from the reference signal. To convert this rate voltage to electrical degrees, it has heretofore been conventional to use a motor-driven servoresolver system, the output being derived from angular shaft position of the driven resolver.

Such systems have their obvious disadvantages compared with a system which is capable of eliminating mechanical parts in favor of electrical components, and especially electrical components of the solid state type. Among the advantages of an all-electrical component system are: (1) greater functional flexibility, (2) greater reliability, (3) reduced maintenance, (4) reduced power requirements, and (5) reduced space requirements. Generally, this means that an all-electrical component system will have improved performance characteristics and be more economical than a system partly comprising mechanical components.

Therefore, what is illustrated and described herein are all-electrical component embodiments of an electronic circuit capable for replacing an electromechanical servoresolver for receiving a reference signal having a basic repetitive cycle and a rate voltage, the amplitude of which is representative of phase shift, and producing an output indication of phase shift capable of being read in electrical degrees in terms of the repetitive cycle of the reference signal, generally comprising first means connected to the reference signal for producing
    a signal at the frequency of the repetitive cycle of the reference signal delayed by a controlled amount,
second means receiving the delayed signal from said first means and producing a continuous-wave output signal at an integral multiple frequency of said delayed signal and in phase therewith,
a phase change input circuit connected to the rate voltage for producing
    a first output indicating the number of complete 360-degree phase displacements of the rate voltage from the reference signal, the frequency used for indicating the number of phase displacements being either the frequency of the reference signal, a multiple, or a submultiple thereof,
        said first output being capable of being counted in a cumulative register, and
    a signal indicating the fractional part of a 360-degree phase displacement from the reference signal, said signal capable of controlling said first means, and
a divider circuit receiving said continuous-wave signal from said second means for producing a signal at the frequency of the reference signal and in phase with a selected integral cycle of the continuous-wave signal so as to produce a second output,
    said second output being shifted from the reference input by an amount dictated by the rate voltage plus, if desired, a constant.

A circuit having the elements described above produces two outputs, which together form a basis for reading phase shift in degrees. If it is desired to produce a signal, the voltage amplitude of which is an indication of phase shift less than 360-degrees, this may be done by a disclosed network generally comprising a first divider circuit connected to the reference signal for dividing the basic frequency of the reference signal by a given amount,
a second divider circuit connected to said second output to divide the basic frequency of said second output by the same given amount, and
a bistable circuit triggered by the divided outputs from said first and second divider circuit, thereby producing voltage with a positive and negative portion, the average value of which is a measure of phase shift.

The phase shift apparatus of the type described above may conveniently take the form of the embodiments shown in the attached illustrations. A reference input may take the form of any signal having a recurring impulse or repetition rate, commonly either a continuous-wave signal or cyclical pulses. A rate voltage may be an A-C signal at the same frequency as the reference signal and with an average amplitude over a complete cycle of positive and negative portions that is directly proportional to a phase separation from the reference signal, therefore providing phase shift information.

Although phase shift can be represented in terms of degrees of separation in terms of any convenient comparison frequency, the frequency of the applied reference signal may readily be used.

Virtually any phase shift represented by virtually any amplitude of rate voltage may be compared in accordance with the invention described herein. The amplitude of the rate voltage may be large so as to represent many complete 360-degree cycles of phase shift from the reference signal in terms of the comparison frequency; the amplitude of the rate voltage may be small so as to represent only a small phase shift of a few degrees in terms of the comparison frequency; or the amplitude may be large enough to represent any combination of complete cycle shifts plus an additional fractional, or partial, cycle shift.

In this invention, the phase shift output may be represented by two outputs, the first output being a signal that is capable of triggering a counting circuit or cumulative register for each 360-degree phase separation from the reference signal in terms of the comparison frequency. Such comparison frequency may be conveniently selected to be the frequency of the reference signal. The second output may be a signal at the frequency of the reference signal and shifted in phase therefrom by an amount equivalent to the fractional, or partial, cycle shift separation remaining after all of the complete, or 360-degree, phase shifted cycles have been counted.

A constant phase shift may be added to or subtracted from the output from the circuit that indicates the fractional phase separation to compensate for any inherent constant phase shift, such as to compensate for inherent phase shift caused by circuit components or such as to compensate for a constant phase shift caused by the Doppler effect. This constant may conveniently be inserted by adjusting the output by one or more complete cycles of a selected multiple of the comparison frequency.

Additional circuits, as shown in the illustrated embodiments, may be employed if it is desired that the fractional phase shift information, above described as being a signal at the frequency of the reference signal and shifted in phase therefrom by an amount equivalent to the fractional separation remaining after the complete phase shifted cycles have been counted, be converted to be in terms of a voltage amplitude.

More particular description of the invention may be had by reference to the embodiments thereof which are illustrated in the appended drawings, which form a part of this specification. It is to be noted, however, that the appended drawings illustrate only typical embodiments of the invention and, therefore, are not to be considered limiting of its scope for the invention will admit to other equally effective embodiments.

In the drawings:

FIG. 2 is a time relation diagram of some of the waveforms present in one embodiment of this invention.

FIG. 3 is a block diagram of one of the embodiments of the delay generator shown in FIG. 1.

FIG. 4 is a block diagram of one of the embodiments of the phase change input circuit shown in FIG. 1.

FIG. 5 is a block diagram of another of the embodiments of the phase change input circuit shown in FIG. 1.

Input and output conditions

Figure 1:
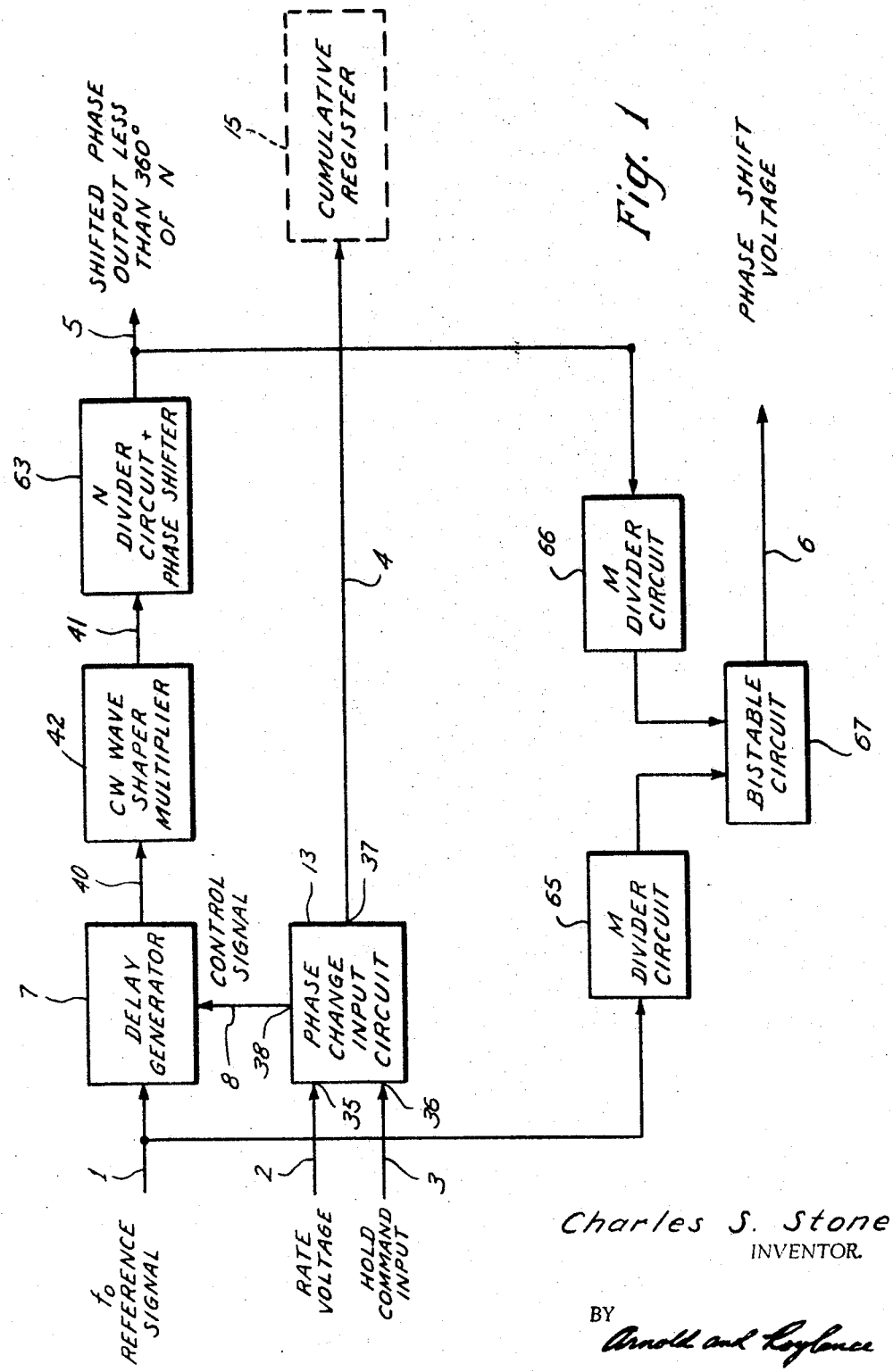
FIG. 1 is a block diagram of one embodiment of this invention.

The inputs to the illustrated circuit embodiments may be as follows: a reference signal 1 at a frequency of $f_o$ and having any suitable repetitive character of waveform (e.g. a sinewave, a chain of pulses, etc.) a rate voltage 2 nominally at the same frequency as the reference signal and having an average voltage amplitude that is determinitive of the phase shift measured by the circuit, and a hold-command signal 3, which may be merely a manually-operated or electrically-operated switch that disconnects the rate voltage 2 input or connects the input normally applied to the rate voltage to a steady zero voltage.

The outputs of the circuits are as follows: a digital readout signal 4, including information of the number of complete cycles of phase shift as represented by the rate voltage 2 from the reference signal 1 in terms of the $f_o$ frequency; an output signal 5 comprising pulses shifted in time from the reference signal 1 by an amount equal to the fractional part of an $f_o$ cycle remaining after the complete cycles of phase shift have been counted; and, optionally, a signal 6 having a fixed frequency relationship with respect to the $f_o$ reference signal 1 and having an average voltage signifying the fractional part of an $f_d$ cycle remaining after the complete cycles of phase shift have been counted.

Overall operation

FIG. 1 shows a simplified block diagram of a preferred embodiment of the invention. Each operating block within the overall block diagram is discussed more fully in detail below and under the various instantaneous waveform conditions and relationships that occur from time to time. Generally, however, the circuit receives an $f_o$ reference signal 1 and a rate voltage 2 indicative of phase displacement and produces output indications in terms of cycles of the reference signal plus a remainder (if any). The integral number of cycles of displacement may be recorded on a cumulative register 15. The remainder may appear both as a repetitive waveform 5 displaced from the reference by the remainder phase displacement amount and as a phase displacement voltage 6.

To produce these outputs, reference signal 1 is applied to delay generator 7 to produce a signal 40 at the same frequency as signal 1, but delayed by an amount controlled by output signal 8 of a signal-shaping circuit, viz., phase change input circuit 13.

Phase change input circuit 13, in turn, receives from an external source the information from which is derived controlling output signal 8, normally from rate voltage 2. Internal to phase change input circuit 13, the integral cycle information (the number of complete 360-degree phase displacements) is removed in the form of a signal 4, leaving the remainder information as controlling output signal 8.

A continuous-wave (CW) shaper-multiplier circuit 42 receives output 40 from delay generator 7 and produces a signal 41, which is a signal having a frequency that is an integer multiple of the frequency of output signal 40 and smoothly shaped for subsequent electronic handling. For instance, signal 41 may be a signal with every tenth cycle corresponding in time with a cycle of applied signal 40.

An N divider circuit 63, which may include a phase shifter network, receives the applied signal 41 and produces an output signal 5. This signal 5 may be merely a cleaned-up version of signal 40 and in phase therewith. However, if desired, a constant phase shift may be inserted into signal 5 by keying the N divider circuit off a different one of the cycles of the multiplied signal 41 than that cycle thereof which corresponds to a cycle of signal 40.

In any event, signal 5 is an output at the same frequency as $f_o$ reference signal 1 phase displaced or shifted therefrom by the remainder information amount (determined by control signal 8) plus a constant (if desired).

To obtain a voltage 6 indicative of the phase displacement amount of signal 5 from $f_o$ reference signal 1, M divider circuits 65 and 66 are respectively triggered by signals 1 and 5. These circuits, in turn, determine the operating state of bistable circuit 67. The ratio of the positive cycles to the negative cycles resulting from this triggering action may be converted in an integrator circuit (which may be included within circuit 67) to develop DC phase shifted voltage 6.

It may be observed that to obtain an indication of equal positive and negative cycles from the triggering action by circuits 65 and 6 when there is no phase shift between signals 1 and 5, one or the other of these signals must be phase inverted (or otherwise phase shifted 180 degrees) prior to or at the time of triggering circuit 67.

Delay generator

In the embodiment of the invention shown in FIG. 1, a delay generator 7 is shown as the means for delaying an input reference signal 1 in response to an applied control signal 8.

The phase reference input signal 1 may be of almost any description and still be operable in the circuit shown, so long as it has an evenly spaced repetitive cycle. Most commonly, the phase reference input will be either a continuous sinewave or a series of evenly spaced pulses at a basic frequency or repetition rate. Waveform A of FIG. 2 depicts a series of evenly spaced pulses that may be applied as a phase reference input. For convenience, the reference signal is referred to as $f_o$.

The control signal 8, whose source will be discussed below, may be an A-C signal at the same frequency as $f_o$ and having a waveshape with both a positive portion and a negative portion whose ratio of respective amplitudes and/or respective time intervals establish the indicated delay from the reference signal 1.

One acceptable circuit arrangement that may be used as a delay generator 7, i.e. a circuit that will produce a chain of pulses delayed in time from the recurring cycles of the incoming signal 1 as determined by the variable control voltage 8, includes a phase-shift bridge circuit (not shown), such as described on page 715 of Electronic Fundamental and Applications, by Ryder, copyright 1950 by Prentice-Hall, Inc. The applied control voltage 8 causes the values of the various bridge parameters in a variable delay circuit 9 (FIG. 3) within the delay generator 7 to vary by a controlled amount, as determined by the control signal 8, to effect a suitable phase shift from the applied reference signal 1.

One circuit arrangement that may be used for ensuring that the reference signal 1 is in proper wave shape to be controlled by the variable delay circuit 9 is a wave-shaping circuit such as the blocking oscillator 10 shown in FIG. 3.

The output from the delay generator 7 may be converted to be in the form of pulses occurring at a repetition, or recurring, rate equal to that of $f_0$ and having a very rich high harmonic content by applying the output of the variable delay circuit 9 through a pulse producing circuit such as the blocking oscillator 11.

As an example of typical delay generator 7 operation, consider the application of a control signal 8 voltage having an average amplitude of zero. The reference signal 1 at the $f_0$ frequency would merely be converted from whatever shape of signal it originally was to a chain of high-harmonic content pulses occuring at the $f_0$ frequency and exactly coinciding in time with the cycles of the reference signal.

Assume now that the control signal 8 voltage has an average amplitude that is positive, or one in which the positive portion of a complete period is a longer time interval than the negative portion. The impressed voltages on the phase shift variable delay circuit 9, which may be considered to be a bridge circuit, are unbalanced and there is an effective phase shift in the resulting output pulses so that they no longer coincide with the cycles of the applied input reference signal 1. The phase shift may be regulated so that the output pulses either lead or lag the reference signal 1, but for illustrative purposes it may be assumed that the phase shift occurs as shown in waveform B of FIG. 2, which shows a lagging or delayed phase shift by a delay amount 12.

The control signal 8 may at times have an average negative value. The phase-shift parameters would then cause a phase shift in the opposite direction from the reference signal 1. Of course, whether the output from the delay generator 7 lags the reference signal 1 with a positive control voltage (as assumed herein) or with a negative control voltage can be regulated by placing and adjusting the parameters in the variable delay circuit 9.

Feedback integrator

One circuit means that may be used for establishing the control voltage signal 8 applied to the delay generator 7 and also the means for developing pulses that may be counted to indicate the complete cycles of phase shift in terms of the $f_0$ frequency from the reference signal 1 is the phase change input circuit 13 shown in FIG. 4.

The means illustrated for shaping the applied rate voltage 2 into the desired integrated shape for application as the control signal 8 for the delay generator 7 is the feedback integrator circuit 14. The means for resetting the feedback integrator circuit 14 each time a full cycle of phase shift from the reference signal 1 occurs and pulsing a counter, such as cumulative register 15, shown in FIG. 1, may be such circuits as the Schmitt circuit arrangement shown in FIG. 4. Also, the digital-analog scaler and related circuits shown in FIG. 5 may be used for producing a control signal 8 and a suitable signal for pulsing the cumulative register 15.

In the embodiment of FIG. 4, the input rate voltage 2 and the hold-command input 3 are both applied through a switch 16 to a feedback integrator circuit 14. It should be first noted that when the hold-command input 3 is applied, the input to the feedback integrator circuit 14 is either electrically clamped to ground or the switch itself is thrown to a position which does not have an input applied, i.e. the circuit input is open circuited.

The integrator circuit 14 comprises a resistance element 17 in series with an amplifier 18 as shunted by a capacitance element 19. The input rate voltage 2 at the frequency equal to $f_0$ has a positive and a negative portion. The relative amplitude and period of the two portions determine the average amplitude over a complete cycle. This means that if the two cycles are equal but that there is a larger positive peak amplitude than a negative peak amplitude, then the average voltage is positive. Similarly, if the amplitudes are equal, but the positive period is longer in duration than the negative period, then the average amplitude is positive.

In either case, when the entire signal 2 is integrated, the resulting waveform has a negative and a positive portion and a zero crossover point, where the voltage changes from one polarity to the other. This crossover point will not necessarily coincide in time with the crossover point of the non-integrated waveform when that waveform changes polarity. It will, instead, depend upon the rate of change from one polarity to the other and the ratio of the positive quantity to the negative quantity. Therefore, it can be easily seen that the crossover point of the control signal 8 may slide within the complete cycle depending on the amplitude of the rate voltage 2 and the positive or negative nature of its average amplitude.

It is fundamentally true of an integrated signal that the amplitude must eventually attain, but cannot exceed, a D-C level equal to that of the input signal. Therefore, over a complete cycle, even though the crossover point of the control signal 8 is not in the same location as for that of the input rate voltage 2, the average voltage of output signal 8 will be equal to that of the input rate voltage 2, except as reset in accordance with the description given below.

Schmitt switch and reset driver

As shown in FIG. 4, the output control signal 8 from the feedback integrator circuit 14 may be fed to each of two Schmitt switches, or trigger means, viz a positive limit Schmitt switch 20 and a negative limit Schmitt switch 21. When the output (the control signal 8) voltage attains a value that is determined by an auxiliary bias network 22 or 23 to be that which is equivalent to a full 360-degree cycle of phase shift, the corresponding Schmitt switch 20 or 21 will conduct and trigger a relay means such as the reset switch driver network 24 and the relay 29 combination. This in turn dumps the stored charge on capacitance 19, reduces the output 8 of the feedback integrator 14 to a nominal value, and produces a vector impulse output 4 to a counter 31. Notice that a complete cycle of phase shift, whether it be positive or negative, results in a resetting of the feedback integrator 14.

This reset switch driver 24 may be a circuit as shown in FIG. 4, comprising a grounded-emitter transistor 25 and two diodes 26 and 27 connected in an AND circuit to the base of transistor 25. When a diode conducts, the transistor 25 is driven into conduction to excite a coil 28 connected to the emitter of transistor 25 of a relay 29 and to close a reset switch 30 located across the capacitance portion 19 of the feedback integrator network 14. When the switch 30 is closed, the capacitance 19 is allowed to discharge effectively to the value of the rate input 2 to the feedback integrator circuit 14.

At the same time, the output 4, which is tied to control voltage 8, of feedback integrator circuit 14 may be connected to a counter 31, such as digital cumulative register 15, having a high input impedance. The discharging of the capacitance 19 results in pulses that may be sensed by the counter 31 to indicate a complete cycle of phase shift. The positive or negative charge that is built up on the capacitance 19 prior to discharge will determine the vector direction of the count, i.e. whether the count will be in a leading or lagging direction with respect to the reference signal 1, and hence reflect as an added or subtracted count by the counter 31.

The counter 31 is made to be cumulative so that it counts and stores the total number of integral cycles of phase shift from the reference signal 1.

It is readily apparent that even a very large rate voltage is not injurious to operation, since this merely means that the counter 31 will receive a rapid succession of pulses. Each time a maximum control voltage 8 that is equal to a complete cycle of phase shift is reached a vector impulse output 4 is produced sufficient to trigger counter 31, and the feedback integrator circuit 14 is reset to a nominal value.

Figure 6:
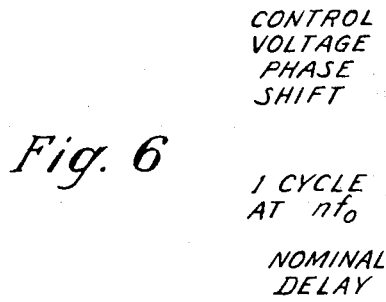
FIG. 6 is a graphic representation of the recycling mechanism of part of the illustrated embodiment shown in FIG. 1 when operating with an applied rate voltage under a constant rate-of-change condition.
Figure 7:
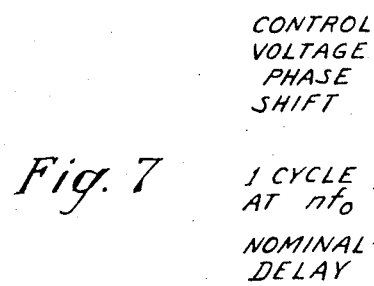
FIG. 7 is a graphic representation of the recycling mechanism of part of the illustrated embodiment shown in FIG. 1 when operating with an applied rate voltage under a variable rate-of-change condition.

Also it should be noticed that the feedback integrator circuit 14 follows a steadily applied rate voltage and a rate voltage changing at a varying rate equally well. In FIG. 6, a rate of change in a positive direction at an even rate is shown. FIG. 7, on the other hand, shows a rate of change in a negative direction at a progressively slower rate. In both instances the integrator circuit 14 is reset when the phase shift equals one cycle of the $f_o$ reference signal 1 regardless of the rate of change of phase shift and the irregular character thereof.

To more fully understand the significance of FIGS. 6 and 7, it should be noted that the horizontal scale is a measure of time and the vertical scale is a measure of phase shift, as determined by the control voltage.

FIG. 6 is a graphical analysis of the action of a positive shift established by an unvarying rate voltage (reflected in an unvarying control voltage), the wavetrain in waveform C of FIG. 2 (a representation of the signal 41 in FIG. 1) being established at a fixed position with respect to the recurring pulses shown in waveform A of FIG. 2 (a representation of signal 1 of FIG. 1). When there is a full cycle of control voltage phase shift at the $nf_o$ frequency, signal 41 is effectively in the same position as it was originally. Therefore, even though real time has progressed, control voltage phase shift is again at a nominal value after one cycle of $nf_o$. If the established control voltage reflects an unvarying phase shift, an even depicted saw-tooth appearing graph results (as shown in FIG. 6). The dotted line marked "Equivalent Phase Change of C" is merely an extrapolation of the individual black lines in the saw-tooth graph. If there is an unvarying phase shift, the line is straight.

FIG. 7 shows the action of a negative shift established by a rate voltage which is varying slightly (reflected in a varying control voltage). In this case, the wavetrain in waveform C of FIG. 2 shifts (shown by the curved dotted line) with respect to the recurring pulses shown in waveform A of FIG. 2.

Notice in both cases the action of the flywheel resonator (described below) smooths fluctuations and causes gradual transitional phase shifting to occur in the presence of a varying rate voltage.

Digital-analog scaler

A possible alternative to the means discussed above comprising feedback integrator 14, Schmitt switch circuits 20 and 21, and reset driver 24 for producing a suitable control voltagt 8 in the form of suitable pulses that may be counted by a counter 31 is the circuit comprising a digital-analog scaler 32 and relaxation oscillators 33 and 34 shown in FIG. 5. The drawings are illustrated in such a manner that the embodiment of FIG. 5 may be capable of direct substitution with the embodiment illustrated in FIG. 4 as the phase change input circuit 13 shown in FIG. 1 at the rate input point 35, the hold-command input point 36, the cumulative register output point 37, and the control voltage output point 38.

The digial-analog scaler 32 is capable of responding to a change of voltage at its input, either the impulse rate voltage 2 or the hold-command input voltage 3, to produce an acceptable control voltage 8 to the delay generator 7. This voltage may be in the form of an integrated waveshape, but may be of any other configuration so long as it is compatible with the variable delay circuit 9 within the delay generator 7 for producing the required phase delay 12 (or advance). In any event, the digital counter portion of the scaler 32 will reset itself when a certain maximum value is reached so as to reduce the scaler output to a nominal value.

At the same time that the scaler 32 is reset, the resetting voltage is supplied to a selected one of two relaxation oscillators 33 and 34 for sending an impulse through an OR network 39 for triggering a cumulative register connected to the output of the OR network. One of the relaxation oscillators, viz. the advance oscillator 33, is triggered when the count is in the positive direction (determined by a positive rate voltage 2) and the other relaxation oscillator, the retard oscillator 34, is triggered when the count is in the negative direction as determined by a negative rate voltage 2.

In summary, the series of circuits for producing a positive pulse to the register may be the following series of circuits, the first of which receives the rate voltage as an input: (1) an analog-to-digital converter triggered by a positive voltage, (2) a scaler to produce an output upon the reaching of a predetermined count and (3) a relaxation oscillator connected to the first stage of the scaler, thereby producing a signal 4 to the register. An adder connected to each of the stages in this scaler is used to produce a control signal. A similar arrangement is used for operation with a negative applied rate voltage. The outputs of the two series arrangements of circuits (positive voltage and negative voltage operated) may be conveniently connected through OR circuits.

Flywheel resonator

The $f_o$ delayed signal 40, shown as waveform B in FIG. 2, from the delay generator 7 is suplied to a circuit that will produce a smooth continuous sinewave output in the form of $nf_o$ delayed signal 41, shown as waveform C in FIG. 2, at a frequency that is a high harmonic of the reference delayed signal 40. One such $cw$ wave-shaper and multiplier network means 42 that may be used to accomplish this result is a flywheel resonator, although there are other circuits that may be used with equal success.

The flywheel resonator preferably is tuned to a high-order harmonic of about 10 to 100 times the frequency of the $f_o$ delayed signal 40 supplied to it so as to produce an output that is a continuous sinewave signal having a fixed phase relation wtih the $f_o$ delayed signal 40. If the tenth harmonic is chosen, for example, every tenth cycle from the flywheel resonator will coincide with a pulse or cycle of the $f_o$ delayed signal 40 supplied to the flywheel resonator.

For convenience of illustration, the fourth harmonic signal is shown as waveform C as the multiplied $cw$ signal. Also for convenience, since the fixed relationship between the $f_o$ delayed signal 40 and signal 41 from the flywheel resonator exists, the output signal from the flywheel resonator may be referred to as the $nf_o$ delayed signal 41. The $n$ in this expression signifies the selected integral harmonic at which the flywheel resonator operates.

The applied $f_o$ delayed signal 40 from the delay generator 7 may be in the form of pulses at a repetition frequency equal to that of the $f_o$ signal 1. To convert this input to a sinewave at this same frequency, filters may be used or an oscillator of any conventional design resonating at the $f_o$ frequency that is capable of being excited by the $f_o$ delayed pulse train may be used.

Figure 10:
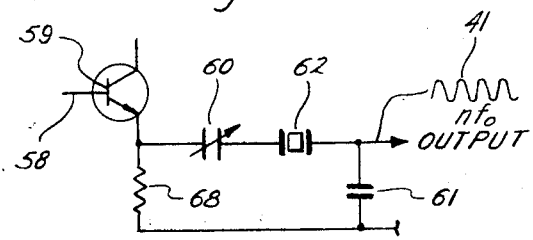
FIG. 10 is a partial schematic diagram of one embodiment of the cw wave shaper multiplier shown in FIG. 1.

Regardless of the circuit used to establish the $f_o$ delayed signal as a sinewave signal 43 (FIG. 8), after it has been so shaped this signal may be applied to a "preringing" circuit. Such a circuit arrangement is particularly valuable when the frequency of the applied signal is much smaller than the natural harmonic frequency of the flywheel resonator circuit, such as shown in FIG. 10, and the flywheel resonator is, therefore, difficult to excite.

Figure 8:
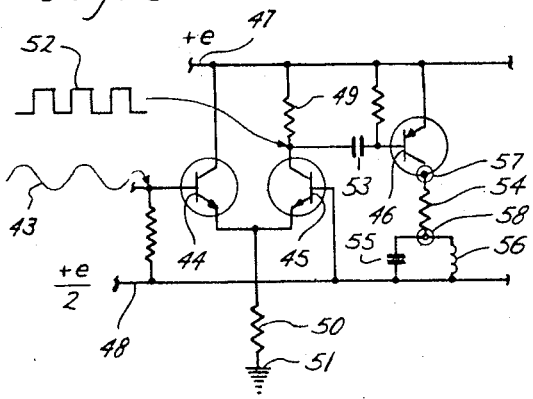
FIG. 8 is a partial schematic diagram of one embodiment of the cw wave shaper multiplier shown in FIG. 1.

The illustrated embodiment of FIG. 8 shows a circuit for establishing a square wave comprising three active components, viz. transistors 44 and 45 and a switch transistor 46. Transistors 44 and 45 are shown as npn transistors and transistor 46 is shown as a pnp transistor, although it should be understood that under different biasing arrangements, the techniques of which are well known by electronic technicians, pnp transistors may be substituted for npn transistors and npn transistors may be substituted for pnp transistors. As shown, a positive D-C voltage 47 of a $+e$ value is applied for determining the bias operation of these three transistors.

The sinewave signal 43 applied to the base of transistor 44 comprises positive and negative half cycles. When a positive half cycle is applied to transistor 44, it conducts and places $+e$ voltage 47 on the emitters of transistors 44 and 45.

When $+e$ voltage 47 is applied to the emitter of transistor 45, the emitter is more positive than the base of transistor 45, which has a voltage 48 of $+e/2$ applied thereto. This causes the collector of transistor 45 to become established at the $+e$ voltage 47.

On the other hand, when the negative half cycle of sinewave signal 43 is applied to the base of transistor 44, transistor 44 cuts off and applies essentially a ground, or zero signal, to the junction of the emitters of transistors 44 and 45.

When this happens the base of the transistor 45 (tied to $+e/2$ voltage 48) is more positive than its emitter and transistor 45 conducts. This, in turn, causes the collector of transistor 45 to drop to a lower value than $+e$ voltage 47 in accordance with the ratio between the resistor 49 in the collector circuit of transistor 45 and the resistor 50, located between ground 51 and the connection of the emitters of transistor 44 and 45. The resulting output at the collector of transistor 45 is a square wave signal 52 that is in phase with the sinewave signal 43 applied to the base of transistor 44. The signal 52 varies between a level of $+e/2$ voltage 48 and a level of $+e$ voltage 47, or effectively there is a D-C component of $+e/2$ superimposed on a square wave having a peak-to-peak amplitude of $+e/2$.

The square wave signal 52 on the collector of transistor 45 is applied to the base of switch transistor 46 by way of capacitor 53. The emitter of transistor 46 is directly tied to the $+e$ bias voltage 47 and the collector of transistor 46 is connected to the $+E/2$ voltage 48 through resistor 54 connected in series with the parallel combination of capacitor 55 and inductor 56.

When $+e$ voltage 47 is applied to the base of transistor 46, there is no voltage difference between the base voltage and the $+e$ voltage 47 permanently connected to the emitter of transistor 46 and the transistor 46 is cut off, or rendered non-conductive, and the switch is said to be open. When transistor 46 is not conducting, the collector of transistor 46 is established very close to the $+e/2$ voltage level.

When the base of transistor 46 goes to a level less than the $+e$ voltage 47 (e.g., when it goes to a level of $+e/2$) transistor 46 conducts and the collector is effectively connected to the $+e$ voltage 47 through the emitter-collector diode of the transistor 46. In this state, the switch is said to be closed. Through the transistor 46, the collector of the transistor is approximately set at the $+e$ voltage 47.

Figure 9:
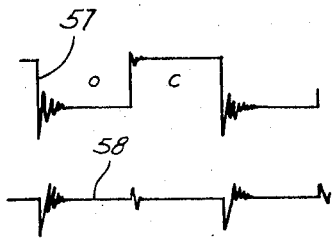
FIG. 9 is a time relation diagram of some of the waveforms present in the circuit of the schematic diagram shown in FIG. 8.

When the base returns to the $+e$ voltage 47 and cuts off, or opens, transistor 46, the collector of the transistor 46 instantaneously tries to make the transition from $+e$ voltage to $+e/2$ voltage, which it can most readily do through capacitor 55. This transition is the negative-going edge of the waveform between the C cycle and the O cycle shown in the top waveform of FIG. 9. Capacitor 55 discharges across inductor 56, which in turn resists and tries to set up a charge on capacitor 55. Together, therefore transistor 46, capacitor 55 and inductor 56 comprise a resonant active switch means. The resulting above-described resonating oscillations may be referred to as "ringing," the frequency of which is very high with respect to $f_o$. On the collector 57 of transistor 46, this ringing occurs around the $+e/2$ level. The resulting waveform on the collector of transistor 46 is shown in the top waveform of FIG. 9. The O (switch open) and C (switch closed) cycles of the waveform on collector 57 occur at a recurring rate equal to $f_o$ and the ringing occurs at a frequency determined by capacitor 55 and inductor 56.

For convenience of reference, the point between resistor 54 and the junction of the parallel combination of capacitor 55 and resistor 56 is referred to as point 58. Since there is no resistive component between point 58 and the $+e/2$ voltage 48, the entire waveform at point 58 is centered about the $+e/2$ level, or is essentially without a variation in D-C level. There is very little ringing at the instant transistor 46 changes from the open state to the closed state since when transistor 46 is closed the collector is essentially tied to the $+e$ voltage 47. The waveform at point 48 is shown as the lower waveform in FIG. 9.

The ringing circuit shown in FIG. 8 may be isolated from the subsequent oscillating stage by a transistor 59, as shown in FIG. 10. The transistor 59 that is shown is an npn transistor connected as an emitter follower, although again under different biasing arrangements a pnp transistor may be substituted to function similarly.

Besides transistor 59, the crystal resonator stage shown in FIG. 10 may also comprise capacitors 60 and 61, crystal 62 and resistor 68. The resonator stage is tuned to respond to the desired high harmonic of the applied frequency, normally on the order of 10 to 100 times the applied frequency. Capacitor 60 is tunable so that the output from the resonator may be peaked. Also, being crystal-controlled, the output 41 is very stable.

The ringing applied signal at point 58 has the effect of exciting the resonator into oscillation even though the applied frequency may be somewhat off the tuned resonant frequency of the crystal resonator. In any event, the output from the resonator circuit of FIG. 10 is a continuous-wave signal 41, ideally a sinewave, at a frequency of $nf_o$, the $n$ standing for the selected multiple of the applied $f_o$ frequency. Every $n$th cycle of the $nf_o$ output is in phase with a cycle of the $f_o$ delayed signal 40 applied to the flywheel resonator. This means that if the 10th harmonic is selected for the resonant frequency of the oscillator, then every 10th output cycle of signal 41 is in phase with a cycle of the input signal 40.

N divider and phase shift circuit

The continuous-wave $nf_o$ delayed signal 41 from the flywheel resonator, at frequency of $nf_o$, and shown as waveform C in FIG. 2, may be applied to N divider circuit 63, as shown in FIG. 1. This divider circuit divides the $nf_o$ signal by $n$, i.e. the selected integral cycle of the continuous-wave signal, so as to produce a signal having an output signal 5 equal in frequency to $f_o$, but shifted, if desired, from $f_o$ delayed (FIG. 2B) by an amount 64 (FIG. 2D) dependent upon which $nf_o$ delayed (FIG. 2C) cycle is chosen for operation. A blocking oscillator, or other similar means, may be included in the circuit to produce the output signal in the form of sharp spikes, rather than a continuous wave, if desired.

The production of an output of sharply spiked pulses from an applied continuous wave signal may be the following series combination of circuits: an amplifier, a clipper, a series of bistable multivibrators connected to divide by the appropriate amount, and a blocking oscillator. The amplifier and clipper may merely convert the continuous wave to approximately a square wave suitable for triggering a conventional bistable multivibrator. The series of multivibrators may be connected to successively divide the input square wave by two, by two again, and so on to achieve the appropriate frequency division. The output from the multivibrator counter is in the form of a square wave that may then be transformed into a series of spiked pulses by any convenient means, such as by a blocking oscillator, triggered by the square wave.

Phase shift voltage circuits

To produce a voltage which is representative of the phase shift indicated by waveform D, the M divider circuits 65 and 66 and the linear phase comparator bistable circuit 67 may be included. The integer $m$ is selected as a convenient division quantity; even divide-by-two circuits are acceptable for circuits 65 and 66.

As shown, the circuit 65 derives its input directly from the $f_o$ phase reference input signal and the circuit 66 derives its input from the shifted phase pulses in signal 5, which, as noted above, is at the same frequency as $f_o$ but at a shifted phase position. As is apparent from FIG. 2, waveform D (signal 5 in FIG. 1) occurs at a later time than waveform A (reference signal 1).

The bistable circuit 67 may be of any conventional bistable design, such as a flip-flop circuit, that is capable of being triggered to its alternate state by either the pulse received from the circuit 65 or the circuit 66. The output signal 6 from the bistable circuit 67 is essentially a square wave, the negative portion having a variable duration with respect to the positive portion, but with the overall complete cycle duration remaining constant. The amplitude of the negative portion is equal to the amplitude of the positive portion.

In the operation of bistable circuit 67, a pulse from the circuit 65 occurs and determines the output circuit 67 to be a predetermined state; for convenience, it is assumed to be the positive state. The next pulse applied to circuit 67 is from the circuit 66 which triggers the circuit 67 to produce an output of the opposite state, or, to be consistent with the above assumption, to the negative state. The cycle is completed when the next pulse from the circuit 65 is received by bistable circuit 67 to return it to its positive output state.

If signals 1 and 5, or rather spiked pulses coinciding with signals 1 and 5, were used directly to trigger circuit 67, it is apparent that as the pulse separation between signal 1 and signal 5 occurs, the ratio between the duration of the positive and negative portions changes. Therefore, the average voltage value over a complete cycle of operation is an indication of phase shift.

The same realtiionship between positive and negative portions of a resulting waveform from a bistable circuit triggered by pulses coinciding with signals 1 and 5 exists with respect to a signal produced by a bistable circuit triggered by pulses which are equal divisions of the frequency of signals 1 and 5. The M divider circuits 65 and 66 produce the triggering pulses actually used for controlling the operation of circuit 67.

M divider circuits 65 and 66 are included in the circuit for triggering the bistable circuit 67 principally for two reasons: first, wave-shaping can be performed, which is not possible if the two compared signals 1 and 5 are used to trigger the bistable circuit directly and, second, a larger sampling of pulse spacings can be used to effectively function as a voltage averager. Also, if the compared signals are at extremely high frequencies, there is smoother, more definite operation of the bistable circuit 67.

It should be noted that although the above discussion considered establishing a phase-shift voltage between reference signal 1 ($f_0$) and signal 5 (waveform D) the same technique can be employed to establish a phase shift voltage between any two signals of the same frequency. For instance, in a multi-station navigation system it may be desired to establish phase-shift voltages indicative of the phase shift between each of the slave stations and the master station.

Alternate rate voltages

As described above, the control signal 8 from the phase change input circuit 13 may have either a positive or negative amplitude depending upon the rate voltage 2 applied, which is assumed to be an A-C signal at a frequency equal to reference signal 1. Actually rate voltage 2 may be at a frequency lower than $f_o$. A frequency that is a division of $f_o$, for example, may be used (such as a signal 6 in the form of phase shift voltage).

In fact, even a D-C level may be used since such a voltage would have an "average" value that would be positive or negative during a cycle of the reference signal 1, the only criteria for an appropriate rate voltage. Such a signal would establish a suitable control signal 8. If of a greater voltage amplitude than equivalent to one cycle of phase shift, the voltage 2 would produce appropriate counter pulses to register 15 and would reset circuit 13. When the rate voltage 2 is reduced in amplitude, such as by externally connected equipment or by changing phase shift conditions to a value less than a multiple of 360-degree phase shifts, then the control voltage 8 would produce an appropriate fractional phase shift indication in signal 5 and signal 6.

When the complete phase shift has been indicated by signals 4 and 5, an appropriate return loop may be used to reduce the rate voltage 2 to a zero value so that no additional change will be reflected.

Constant phase shift

Assuming no phase shift caused by circuit components or by external conditions (such as may be caused by a constant Doppler phase shift) the above-described circuits produce an output in accordance with the following described example.

A rate voltage 2 having an average positive voltage equivalent to 100 complete cycles plus 200 degrees produces 100 pulses of signal 4 to register 15 plus a control signal 8 which produces a 200-degree phase shift of signals 5 and 6. When the rate voltage 2 increases in a positive-going direction, the total phase shift always is reflected in a count recorded on register 15 plus a phase shift of signals 5 and 6.

It is now assumed that the phase shift starts to decrease caused by a negative rate voltage 2 being applied. The positive control signal 8 equivalent to 200 degrees of positive phase shift above 100 cycles reduces to zero and then builds up as a negative voltage. When the shift is less than a complete cycle, for example 200 degrees, then a negative control voltage equivalent to 200 degrees of phase shift is established. The total phase shift is then reflected in a count on register 15 of 100 less the phase shift reflected in signals 5 and 6 of 200 degrees. Not until a negative phase shift equal to a complete cycle becomes established by rate voltage 2 is the register 15 reduced by an indication of one cycle.

It is apparent that, depending upon how the phase shift is approached, i.e. by a positive-going or a negative-going rate voltage, the same phase shift may be recorded by a count on register 15 plus a fractional cycle of phase shift or by a count on register 15 less a fractional cycle of phase shift.

Alternate triggering means

The discussion of triggering means for the various circuits described herein has referred to positive and negative, or positive-going and negative-going, triggering signals. It should be understood that triggering may be accomplished equally well through the use of varying the level, or amplitude, of the triggering signals, or any other type of distinguishing feature of the triggering signals that can be utilized for triggering so long as the responding circuits are compatible therewith.

Summing network

The control signal from either the feedback integrator shown in FIG. 4 or from the digital-analog scaler shown in FIG. 5 to delay generator 7 may be applied through a summing network (not shown), which may be part of the phase change input circuit 13 shown in FIG. 1. The summing network may be any means for externally (or artificially) increasing or decreasing the indicated phase shift through the application of an external signal. Such external signal may be made cumulative (or exclusive, if desired) of the control signal 8.

Loss of signal

It should also be noted that a complete loss of rate voltage 2 results only in the loss of signals 5 and 6 and not in the loss of the information recorded on register 15. Since the fractionally indicated phase shift may be practically insignificant with respect to the entire phase shift, complete loss of rate voltage 2 does not result in the loss of all of the valuable information.

While several embodiments and variations of the invention have been illustrated and described, it is obvious that substitutes may be made without varying from the scope of the invention.

What is claimed is:
1. A preringing circuit comprising
a first active component biased by a bias voltage and adapted to receive an applied sine wave voltage,
a second active component connected to said first active component for producing a square wave voltage as determined by the operation of said first active component, said square wave voltage fluctuating between said bias voltage and a lesser voltage, and
resonant active switch means connected to said second active component for producing high frequency resonant oscillations as determined by the edges of the square wave voltage from said second active component.

References Cited
UNITED STATES PATENTS

| | | | |
|---|---|---|---|
| 2,370,692 | 3/1945 | Shepard | 324—85 |
| 3,202,769 | 8/1965 | Coleman | 328—155 X |
| 3,206,686 | 9/1965 | Goor | 328—155 |
| 3,229,203 | 1/1966 | Minobara | 324—83 |

RUDOLPH V. ROLINEC, Primary Examiner

P. F. WILLE, Assistant Examiner

U.S. Cl. X.R.

324—83; 328—155

UNITED STATES PATENT OFFICE
CERTIFICATE OF CORRECTION

Patent No. 3,465,264                                September 2, 196

Charles S. Stone

It is certified that error appears in the above identified patent and that said Letters Patent are hereby corrected as shown below:

Column 3, line 54, "of" should read -- from --; line 64, "$f_d$" should read -- $f_o$ --. Column 4, line 52, "6" should read -- 66 --. Column 9, line 58, "+E/2" should read -- +e/2 --. Column 11, line 58, "realtiionshi should read -- relationship --.

Signed and sealed this 2nd day of June 1970.

(SEAL)
Attest:

Edward M. Fletcher, Jr.                          WILLIAM E. SCHUYLER, J1
Attesting Officer                                    Commissioner of Patent